(12) United States Patent
Ryu

(10) Patent No.: US 7,838,578 B2
(45) Date of Patent: Nov. 23, 2010

(54) FUNCTIONAL CORNSTALK BOARD AND PREPARATION METHOD THEREOF

(75) Inventor: Hai-il Ryu, Daejeon (KR)

(73) Assignees: Hail-Il Ryu, Darjeon (KR); Hook Hong, Darjeon (KR)

( * ) Notice: Subject to any disclaimer, the term of this patent is extended or adjusted under 35 U.S.C. 154(b) by 945 days.

(21) Appl. No.: 10/579,864

(22) PCT Filed: Mar. 23, 2006

(86) PCT No.: PCT/KR2006/001060

§ 371 (c)(1),
(2), (4) Date: May 18, 2006

(87) PCT Pub. No.: WO2007/069807

PCT Pub. Date: Jun. 21, 2007

(65) Prior Publication Data

US 2009/0104458 A1    Apr. 23, 2009

(30) Foreign Application Priority Data

Dec. 13, 2005  (KR) .................. 10-2005-0122691
Mar. 15, 2006  (KR) .................. 10-2006-0023878

(51) Int. Cl.
  *B27K 5/00*   (2006.01)
  *C08K 11/00*  (2006.01)
  *B29C 59/02*  (2006.01)

(52) U.S. Cl. .................................. 524/15; 264/320

(58) Field of Classification Search .......... 524/15; 264/320
See application file for complete search history.

(56) References Cited

U.S. PATENT DOCUMENTS

| | | | | |
|---|---|---|---|---|
| 2,440,789 A * | 5/1948 | Van der Pyl | 525/54.21 |
| 2,648,641 A * | 8/1953 | Robison | 523/179 |
| 2,685,529 A * | 8/1954 | Anderson et al. | 106/164.01 |
| 2,733,138 A * | 1/1956 | Clark | 51/303 |
| 2,781,286 A * | 2/1957 | Ayers et al. | 428/529 |
| 3,228,825 A * | 1/1966 | Waggoner | 162/145 |
| 3,389,125 A * | 6/1968 | Dietrick et al. | 528/140 |
| 3,650,820 A * | 3/1972 | DiPietro et al. | 427/391 |
| 3,840,388 A * | 10/1974 | Perlus et al. | 427/377 |
| 4,126,473 A * | 11/1978 | Sobolev et al. | 106/18.12 |
| 4,173,248 A * | 11/1979 | Roberts | 162/141 |
| 4,175,065 A * | 11/1979 | Andersson | 524/541 |
| 4,257,995 A * | 3/1981 | McLaughlin et al. | 264/122 |
| 4,572,815 A * | 2/1986 | Kaiser | 264/115 |
| 4,752,637 A * | 6/1988 | Israel | 524/702 |
| 4,935,457 A * | 6/1990 | Metzner et al. | 524/14 |
| 5,147,710 A * | 9/1992 | Bopp et al. | 428/213 |
| 5,200,267 A * | 4/1993 | Bauer | 428/326 |
| 5,416,139 A * | 5/1995 | Zeiszler | 524/13 |
| 5,635,123 A * | 6/1997 | Riebel et al. | 264/125 |
| 5,663,221 A * | 9/1997 | Barcas | 524/15 |
| 5,723,506 A * | 3/1998 | Glorioso et al. | 521/79 |
| 5,891,937 A * | 4/1999 | Berg et al. | 524/13 |
| 6,051,635 A * | 4/2000 | Hatch | 524/14 |
| 6,403,000 B1 * | 6/2002 | Symons | 264/109 |
| 6,624,217 B1 * | 9/2003 | Tong | 524/9 |
| 6,670,101 B2 * | 12/2003 | Ohba et al. | 430/311 |
| 6,886,306 B2 * | 5/2005 | Churchill et al. | 52/784.11 |
| 2001/0035591 A1 * | 11/2001 | Moriarty et al. | 264/109 |
| 2002/0111400 A1 * | 8/2002 | Afiouni | 524/13 |
| 2004/0194657 A1 * | 10/2004 | Lally | 106/18.12 |
| 2004/0256065 A1 * | 12/2004 | Ahmed et al. | 162/26 |
| 2005/0165140 A1 * | 7/2005 | Pillai et al. | 524/59 |
| 2006/0173105 A1 * | 8/2006 | Griffin et al. | 524/35 |
| 2007/0020476 A1 * | 1/2007 | Kintzley et al. | 428/537.1 |
| 2008/0250741 A1 * | 10/2008 | Bennett et al. | 52/506.01 |
| 2009/0020246 A1 * | 1/2009 | Ryu et al. | 162/96 |

FOREIGN PATENT DOCUMENTS

| | | | |
|---|---|---|---|
| CN | 1034159 | | 7/1989 |
| CN | 1038613 | | 1/1990 |
| KR | 20030093057 | | 12/2003 |
| KR | 200300993057 | A * | 12/2003 |
| WO | 99/02318 | | 1/1999 |

OTHER PUBLICATIONS

Machine translation of KR200300993057A (2009).*

* cited by examiner

*Primary Examiner*—Mark Eashoo
*Assistant Examiner*—Liam J Heincer
(74) *Attorney, Agent, or Firm*—Occhiuti Rohlicek & Tsao LLP

(57) ABSTRACT

Disclosed is a functional cornstalk board and a preparation method thereof. The functional cornstalk board includes 1 to 10 parts by weight of a curing agent, based on the total weight of the mixture of 6 to 10 parts by weight of cornstalk and 0.2 to 2 parts by weight of a binder or silicate. It is obtained by molding the raw material at a molding temperature of 120 to 210° C. and a molding pressure of 10 to 30,000 kgf/cm$^2$ for 0.5 to 20 minutes using a semiautomatic or multistage automatic heat press device.

12 Claims, No Drawings

FUNCTIONAL CORNSTALK BOARD AND PREPARATION METHOD THEREOF

TECHNICAL FIELD

The present invention relates to a functional cornstalk board and a preparation method thereof, and more specifically to a functional cornstalk board obtained by molding a raw material under a predetermined molding condition using a semiautomatic or multistage automatic heat press device, wherein the raw material includes a curing agent in a mixture of cornstalk and a binder or silicate.

BACKGROUND ART

The functional cornstalk board of the present invention is a cornstalk plywood material maintaining an excellent bending strength and an excellent density, and capable of manufacturing the cornstalk plywood material into various shapes and desired standards of a woodcut, scantling, plywood, construction materials and a slate due to its easy molding by the pressure and the extrusion, and therefore the functional cornstalk board may be environment-friendly, mass-produced and economical since the cornstalk is used as the unlimited resource without adversely affecting the forests so as to obtain woods or plywoods, and particularly it may be light in weight, easily processed in molding and cutting, and also used for application products into which the colors are added.

Maize is an annual plant that is widely distributed over the world and approximately 1.5 to 2.5 m tall, and the ear of maize, which may be used as a fruit, has been widely cultivated for the edible plant or the plant for animals.

The cornstalk by-produced in the maize is produced after harvesting the ear of maize, and therefore it was simply wasted as the farmyard manure in the past, or partially used as a domestic animal feed, a food additive material. However, there have been recently many studies in such various fields as in generating the various substitute energy sources such as ethanol, manufacturing the pulp.

The study on the cornstalk has been conducted in the field of construction materials, and partially tested by adding the cornstalk into interior/exterior materials.

However, if the cornstalk is used as the interior/exterior materials, a specific binder should be suitably required for the main component "cornstalk", as well as the final product has no practical use as the board or the interior/exterior materials because the molding method and the molding condition of the cornstalk are complicated owing to its essential characteristics. Accordingly, there has been an attempt to develop the cornstalk as the construction materials since it is slightly employed in spite of the enormous recycling value.

DISCLOSURE OF INVENTION

Technical Problem

To solve the above-described problems, it is an objective of the present invention to provide a functional board capable of developing an environment-friendly cornstalk board using cornstalk having cellulose as the main component by searching a binder or silicate and a curing agent the most suitable for the cornstalk and adding them at a specific mixing ratio, and therefore of reducing the environmental pollution and employing it as new construction materials.

Also, it is an objective of the present invention to provide a method for preparing the functional cornstalk board, wherein the functional cornstalk board has an easy molding property and an excellent mechanical property since a binder and a curing agent are mixed with the cornstalk, and then molded under a suitable condition.

Best Mode

Hereinafter, preferred embodiments of the present invention will be described in detail with reference to the accompanying drawings.

The present invention provides a functional cornstalk board obtained by molding a raw material under a predetermined molding condition using a semiautomatic or multistage automatic heat press device, wherein the raw material includes a curing agent in a mixture of cornstalk and a binder or silicate.

That is, the functional cornstalk board of the present invention includes 1 to 10 parts by weight of a curing agent, based on the total weight of a mixture of 6 to 10 parts by weight of cornstalk and 0.2 to 2 parts by weight of a binder or silicate, wherein the functional cornstalk board is obtained by molding the raw material at a molding temperature of 120 to 210° C. and a molding pressure of 10 to 30,000 kgf/cm$^2$ for a molding time of 0.5 to 20 minutes in a semiautomatic or multistage automatic heat press device.

Herein, if the content of the cornstalk is less than 6 parts by weight, then the addition effect of the cornstalk is poor, as well as it is difficult to give a desired mechanical property, while if its content exceeds 10 parts by weight, then it is difficult to mold it into the product due to its very high content.

The functional board of the present invention has an advantage of very high economic value by selecting the unlimited resource of cornstalk belonging to an annual plant since its preparation method is similar to the method for preparing MDF, etc., but the grinded cornstalk or the mechanically pulped fibrous maize material is used as its components, instead of the conventional materials such as wood chip or wood remnants.

Especially, a chemical structure of cornstalk is hydrophilic because the cornstalk is composed of cellulose such as wood, and therefore various binders is used herein for binding them, wherein the binders is selected from the group consisting of melamine formaldehyde glue, urea formaldehyde glue, phenol formaldehyde glue, urea & mixed formaldehyde glue, phenol& urea & mixed formaldehyde glue, urea melamine formaldehyde glue, poly-lauylacrylate, poly-2-ethylhexylacrylate, vinyl acrylic resin, vinyl acetate resin, glues, EVA resin, etc., each easily bound with a —OH group of organic aromatics and celluloses.

Also, the curing agent used herein may include ammonium hydroxide, ammonium chloride, magnesium chloride, aluminum chloride, ammonium phosphate, etc.

In the present invention, if lignin is particularly removed from the cornstalk, its product having the better mechanical property, for example strength may be prepared when then the raw material is steam-heated at about 180° C. using the conventional MDF production process, and then processed and molded through the mechanical pulping process.

In order to give noncombustibility, flame-retarding property and an ability to absorb electromagnetic wave in the certain case, A mixed board may be prepared by adding 2 to 10 parts by weight of each of a phosphoric acid-including flame retardant such as triethylphosphate, etc., a halide-including flame retardant such as bromotriallylphosphate, etc., a sulfur-including flame retardant such as sulfamic acid, etc., an inorganic flame retardant such as ammonium borate, phosphoric acid, sodium silicate, calcium carbonate, titanium oxide, etc., and an electromagnetic shielding component such as alkaline metal salts, alkaline earth metal salts, graphite, activated carbon, carbon fibers, etc., based on 6 to 10 parts by weight of the cornstalk. Also, cornstalk board or plywood made of an adhesive resin may be prepared by fusing stearic acid to polyethylene such as PP, PE, etc. to co-polymerize each other.

According to the present invention, the raw material may be used in various shapes, or as a substitute of wood having the desired standard, or in the form of a desk, a chair, a dresser, furniture, plywood, scantling, material woods, construction materials, gardening materials, road installations, and farming and fishing equipment, and slate, and be changed with soundproofing materials.

Also, the composition may be provided with various physical properties according to the condition such as cutting, grinding, mixing, heating and cooling, depending on its desired nature. Particularly, the molded product has a wooden feel, and therefore hand sawing, mechanical wood processing, planning, nailing, screw nailing, punching, assembling like wood, and handling are easy in the working spots since it does not have brittleness at all.

In particular, the functional board of the present invention is a cornstalk plywood material having a bending strength of 300 to 750 kgf/cm3 and a density of 0.5 to 0.8 g/cm3, wherein the functional board has the characteristics as the construction material, such as cold resistance, a soundproofing property, stiffness, a flame-retarding property, a property to absorb electromagnetic, etc.

BEST MODES FOR CARRYING OUT THE INVENTION

Hereinafter, the present invention will be described in detail referring to preferred embodiments.

Embodiment 1

7 kg of cornstalk grinded in a suitable size was mixed with 1 kg of urea resin, and then 80 g of the curing agent, ammonium chloride, was added thereto to prepare a raw material. The resultant raw material was molded at a temperature of 150° C. and a pressure of 10 kgf/cm2 for 10 minutes to prepare a cornstalk board. It was revealed that the prepared cornstalk board had a bending strength of 300 kg/cm$^3$ and a density of 0.6 g/cm$^3$.

Embodiment 2

7.5 kg of cornstalk grinded in a suitable size was mixed with 1.5 kg of melamine resin, and then 135 g of the curing agent, ammonium chloride, was added thereto to prepare a raw material. The resultant raw material was molded at a temperature of 160° C. and a pressure of 50 kgf/cm$^2$ for 6 minutes to prepare a cornstalk board. It was revealed that the prepared cornstalk board had a bending strength of 320 kg/cm$^3$ and a density of 0.65 g/cm$^3$.

Embodiment 3

8 kg of cornstalk grinded in a suitable size was mixed with 1.0 kg of phenol resin, and then 180 g of the curing agent, magnesium chloride, was added thereto to prepare a raw material. The resultant raw material was molded at a temperature of 180° C. and a pressure of 100 kgf/cm$^2$ for 4 minutes to prepare a cornstalk board. It was revealed that the prepared cornstalk board had a bending strength of 340 kg/cm$^3$ and a density of 0.7 g/cm$^3$.

Embodiment 4

9 kg of cornstalk grinded in a suitable size was mixed with 1.5 kg of a resin material composed of urea and phenol resins, and then 262.5 g of the curing agent, ammonium chloride, was added thereto to prepare a raw material. The resultant raw material was molded at a temperature of 200° C. and a pressure of 11 ton/cm$^2$ for 2 minutes to prepare a cornstalk board. It was revealed that the prepared cornstalk board had a bending strength of 370 kg/cm$^3$ and a density of 0.75 g/cm$^3$.

Embodiment 5

10 kg of cornstalk grinded in a suitable size was mixed with 2 kg of urea resin, and then 360 g of the curing agent, ammonium chloride, was added thereto to prepare a raw material. The resultant raw material was molded at a temperature of 210° C. and a pressure of 12 ton/cm$^2$ for 2 minutes to prepare a cornstalk board. It was revealed that the prepared cornstalk board had a bending strength of 400 kg/cm$^3$ and a density of 0.8 g/cm$^3$.

Embodiment 6

10 kg of cornstalk grinded in a suitable size was mixed with 2 kg of a resin material composed of urea and melamine resins, and then 360 g of the curing agent, ammonium chloride, was added thereto to prepare a raw material. The resultant raw material was molded at a temperature of 210° C. and a pressure of 30 ton/cm$^2$ for 1 minute to prepare a cornstalk board. It was revealed that the prepared cornstalk board had a bending strength of 400 kg/cm$^3$ and a density of 0.8 g/cm$^3$.

Embodiment 7

The raw material prepared in Embodiment 6 was used, but the functional cornstalk board is prepared using, as the preparation of the raw material and the molding method, the conventional MDF manufacturing process consisting of a process for grinding cornstalk, a cooking process, mechanical pulping process, a process for adding resin, a fluidized drying process, a process for storing hopper, an air filtering process, a mat molding process, a process for pressing with a heat press, a cooling process, a cutting process, etc. At this time, it was revealed that the prepared cornstalk board had a bending strength of 390 kg/cm$^3$ and a density of 0.78 g/cm$^3$.

Embodiment 8

In the material prepared in Embodiment 6, 15 wt. % of sodium silicate ($Na_2SiO_3 \cdot 10H_2O$) instead of the resin binder was mixed with 4 wt. % of carbon material on the basis of 100 wt. % of the cornstalk, and molded at a molding temperature of 130° C. and a molding pressure of 1 to 30 ton for a molding time of 2 to 7 minutes, and then the prepared cornstalk board was measured for the physical properties such as density, moisture content, thermal conductivity, strength, adiabatic property, adsorptivity on floating dust, etc. As a result, it was seen that the cornstalk board had the more excellent strength and adiabatic property than those of woods or medium-density fiberboards, as well as the very excellent physical property as the construction material Embodiment 9

As the additives added to the material prepared in Embodiment 6, 3 wt. % of each of a phosphoric acid-including flame retardant (triethylphosphate), a halide-including flame retardant (bromo triallylphosphate), a sulfur-including flame retardant (sulfamic acid), an inorganic flame retardant (ammonium borate), and an electromagnetic shielding component (alkaline metal salt) was mixed with 8 wt. % of the cornstalk, and molded at a molding temperature of 140° C.

and a molding pressure of 1 to 30 ton for a molding time of 2 to 7 minutes to prepare a board, which may be used for a specific purpose.

In the present invention, the predetermined resin binder and the curing agent was used in combination with the grinded cornstalk to prepare a raw material, and then the prepared raw material was molded at a temperature of 120 to 210° C. and a molding pressure of 10 to 30,000 kgf/cm$^2$ for a molding time of 0.5 to 20 minutes to prepare various cornstalk boards, which have a bending strength of 300 to 750 kg/cm$^3$ and a density of 0.4 to 0.85 g/cm$^3$, as described in the embodiments. As a result, the cornstalk board of the present invention may be used as the substitute of wood, medium-density fiberboards (MDF), particle boards, and glued laminated timber (GLT), etc.

Meanwhile, the content of the binder is limited in the present invention, but the raw material has the higher density as the content of the resin is the higher, if necessary.

In the functional board and the preparation method thereof according to the present invention, the design of the related chemical apparatus caused by the product development, and the know-hows about production technique may be also maintained by the inventors, as well as a new environment-friendly material may be prepared which prevails over the competitive pricing and its demand, and is very exceptionally environment-friendly. Accordingly, a method for developing a functional material using the cornstalk of the present invention belongs to a new production technique capable of being substituted since the cornstalk may be freely prepared into the various conventional shapes of woods, synthetic plastics, construction materials, etc. in its application. The cornstalk of the present invention has an advantage that the competitiveness in infrastructural industries of the nations is strengthened due to conservation of the environment and reuse of the resources, as well as it may substitute for the environmentally hazardous materials such as MDF, and plastic boards, etc., and be recycled semi-permanently.

Especially, the method of the present invention may be widely spread into the world since it has the advantage that its components have the same cellulose structure as the pulp and it has an absolute advantage over biodegradation and environmental pollution, as well as it has the advantage that the natural forest may be protected from being lumbered for use of the wood owing to this present invention.

INDUSTRIAL APPLICABILITY

As described above, the functional cornstalk board of the present invention and the preparation method thereof may be useful to be a plywood material obtained by molding a raw material under a predetermined molding condition using a semiautomatic or multistage automatic heat press device, wherein the raw material includes a curing agent in a mixture of cornstalk and a binder or silicate, wherein the functional cornstalk board may maintain an excellent bending strength and an excellent density, and manufacture the cornstalk plywood material into various shapes and desired standards of a woodcut, scantling, plywood, construction materials and a slate due to its easy molding by the pressure and the extrusion, and therefore the functional cornstalk board may be environment-friendly, mass-produced and economical since the cornstalk is used as the unlimited resource without adversely affecting the forests so as to obtain woods or plywoods, and particularly it may be light in weight, easily processed in molding and cutting, and also used for application products into which the colors are added.

Although a few embodiments of the present invention have been shown and described, it would be appreciated by those skilled in the art that various modification and changes might be made in this embodiment without departing from the principles and spirit of the invention, the scope of which is defined in the claims and their equivalents.

What is claimed is:

1. A functional cornstalk board comprising cornstalk, silicate, a curing agent, and 2 to 10 parts by weight of each of a phosphoric acid-including flame retardant, bromotriallylphosphate, a sulfur-including flame retardant, and an inorganic flame retardant based on 6 to 10 parts by weight of the cornstalk; wherein the cornstalk is 6-10 parts by weight and the silicate is 0.2-2 parts by weight, and the curing agent is 1 to 10 parts by weight based on 100 parts by weight of the mixture of the cornstalk and the silicate.

2. The functional cornstalk board according to claim 1, wherein the curing agent is at least one selected from the group consisting of ammonium hydroxide, ammonium chloride, magnesium chloride, aluminium chloride and ammonium phosphate.

3. The functional cornstalk board of claim 1, further comprising 2 to 10 parts by weight of an electromagnetic shielding component based on 6 to 10 parts by weight of the cornstalk.

4. The functional cornstalk board of claim 3, wherein the electromagnetic shielding component is alkaline metal salts, alkaline earth metal salts, graphite, activated carbon, or carbon fibers.

5. The functional cornstalk board of claim 3, wherein the phosphoric acid-including flame retardant is triethylphosphate.

6. The functional cornstalk board of claim 3, wherein the inorganic flame retardant is ammonium borate, phosphoric acid, calcium carbonate, or titanium oxide.

7. The functional cornstalk board of claim 3, wherein the phosphoric acid-including flame retardant is triethylphosphate and the inorganic flame retardant is ammonium borate, phosphoric acid, calcium carbonate, or titanium oxide.

8. The functional cornstalk board of claim 3, wherein the phosphoric acid-including flame retardant is triethylphosphate, the inorganic flame retardant is ammonium borate, phosphoric acid, calcium carbonate, or titanium oxide, and the electromagnetic shielding component is alkaline metal salts, alkaline earth metal salts, graphite, activated carbon, or carbon fibers.

9. The functional cornstalk board of claim 1, wherein the phosphoric acid-including flame retardant is triethylphosphate.

10. The functional cornstalk board of claim 1, wherein the inorganic flame retardant is ammonium borate, phosphoric acid, calcium carbonate, or titanium oxide.

11. The functional cornstalk board of claim 1, wherein the phosphoric acid-including flame retardant is triethylphosphate and the inorganic flame retardant is ammonium borate, phosphoric acid, calcium carbonate, or titanium oxide.

12. A method for preparing the functional cornstalk board as defined in said claim 1, comprising steps of: mixing of ground cornstalk with silicate; adding a curing agent a phosphoric acid-including flame retardant, bromotriallylphosphate, a sulfur-including flame retardant, and an inorganic flame retardant to the resultant mixture to prepare a raw material; and molding the prepared raw material at a molding temperature of 120 to 210° C. and a molding pressure of 10 to 30,000 kg /cm for a molding time of 0.5 to 20 minutes in a semiautomatic or multistage automatic heat press device.

* * * * *